Patented Aug. 29, 1944

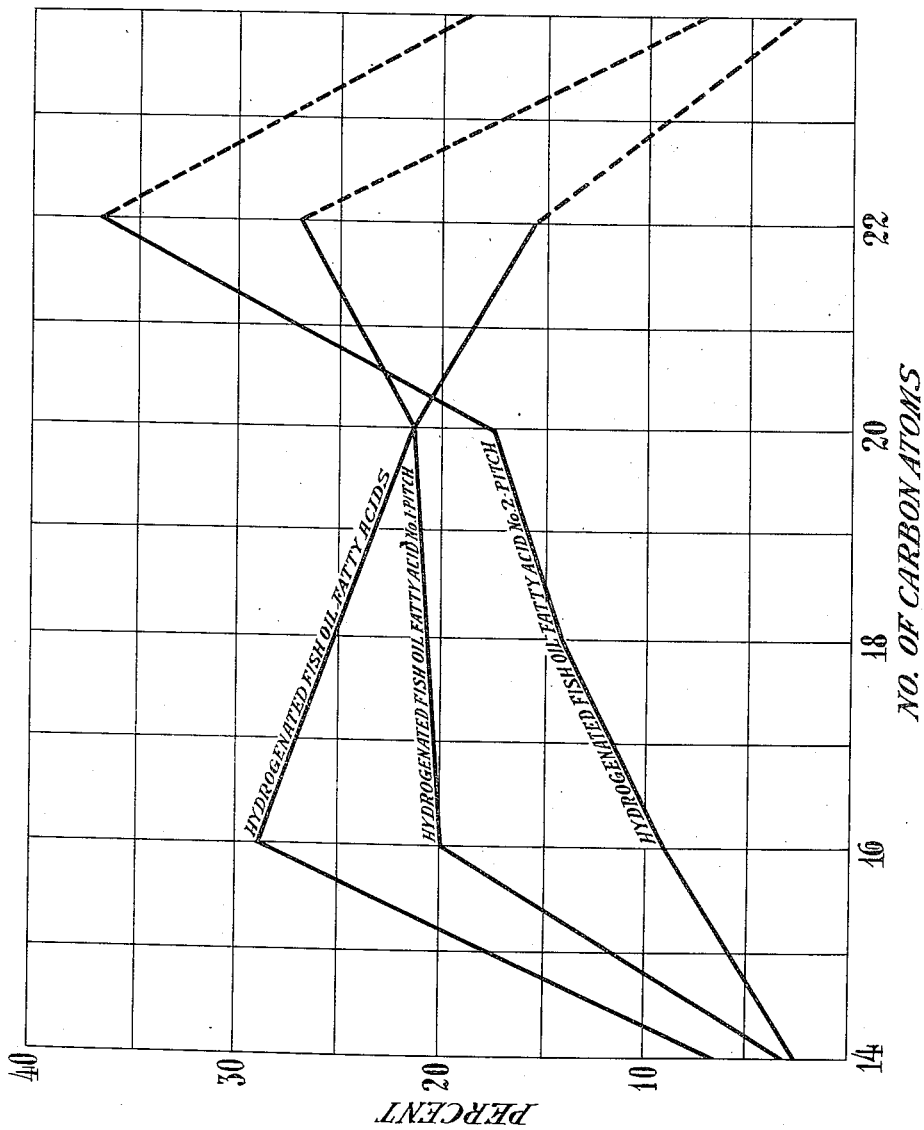

2,356,863

UNITED STATES PATENT OFFICE 2,356,863

COATING COMPOSITION

Frederick H. MacLaren, Munster, and Elmer Wade Adams, Hammond, Ind., assignors to Standard Oil Company, Chicago, Ill., a corporation of Indiana Application March 8, 1941, Serial No. 382,432

7 Claims. (Cl. 106—14)

The present invention relates to improvements in coating compositions and more particularly to that class of coating agents known as slushing compounds. Slushing compounds are used for the protection of metals against corrosion and rusting during storage or transportation. In the case of certain slushing compounds, particularly those having a fluid or semi-fluid consistency, the coating which has been applied to the metal surface will slip and leave the metal surface exposed and therefore subject to corrosion. A possible explanation is that the sum of adhesive forces in the film or coating and the cohesive forces between the coating and the metal surface are not sufficient to overcome the weight of the coating itself. Clearly, therefore, it is desirable to provide a slushing compound which will not slip from the metal surfaces.

It is therefore an object of the present invention to produce a coating composition which will not slip even when applied to a vertical surface.

Other objects and advantages of the invention will become apparent from the following description thereof read in conjunction with the accompanying drawing which forms a part of the present specification, in which the figure is a chart showing the fatty acid composition of the material used as the effective constituent of our improved compound.

The material, which is added to the coating compositions, comprises predominantly $C_{20}$ to $C_{24}$ and higher molecular weight fatty acids. This material is obtained by the distillation and hydrogenation of fish oils. The fish oil which may be used, for example sardine oil, herring, cod, menhaden or the like, is first split by any of the well known methods to produce glycerine and fatty acids. After separation of the glycerine the fatty acids are hydrogenated. If desired the fish oil may be hydrogenated first and then split to produce glycerine and hydrogenated fatty acids. The hydrogenated fatty acids are subsequently distilled to produce an overhead distillate of hydrogenated fish oil fatty acids and a residue referred to herein as No. 1 pitch. The No. 1 pitch in which are concentrated residual fats and some high molecular weight fatty acids may be used as such for our purposes. However, it is preferred to submit the No. 1 pitch to a further splitting operation to produce more glycerine and hydrogenated fatty acids. After separation of the glycerine the hydrogenated fatty acids are distilled to produce an overhead product of hydrogenated fish oil fatty acids which may be combined with the distillate from the first distillation. The residue resulting from the second distillation is the material we prefer to use and is referred to herein as No. 2 pitch.

These pitches although commonly referred to as stearine pitch are not to be confused with the tarry, fatty acid pitches obtained by the distillation of animal or vegetable fatty materials. The pitch obtained as a residue in the distillation of hydrogenated fish oils is distinguished from the so-called stearine pitches from animal and vegetable fatty materials in that the latter are unsaturated, relatively high in unsaponifiable matter, and deficient in fatty acids above $C_{18}$. In contrast the pitches obtained from distillation of hydrogenated fish oils are saturated, rich in $C_{20}$, $C_{22}$, $C_{24}$ and higher molecular weight fatty acids, and are relatively poor in unsaponifiable matter. These pitches contain at least 50% of $C_{20}$ to $C_{24}$ and higher molecular weight fatty acids, counting, in addition to the free fatty acids the fatty acids obtainable by hydrolyzing the fats present in the pitches. Stearine pitches obtained in the distillation of vegetable and animal fats are dark, tarry, materials whereas the pitches obtained from the distillation of hydrogenated fish oils are crystalline in structure and are of relatively light color.

The inspections on representative samples of No. 1 pitch and No. 2 pitch are given in Table I below.

TABLE I

Constants on stearine pitch

| | No. 1 pitch | | No. 2 pitch | |
|---|---|---|---|---|
| Saponification No. mgm. KOH/gm | | | 151 | 152.6 |
| Free fatty acid (as oleic) percent | 16.6 | 18.4 | 10.5 | 15.3 |
| Total fatty acid do | 93 | | 86.5 | 86.3 |
| Fat do | 79.7 | 79.7 | 79.3 | 74.2 |
| Neutralization No. (acids) mgm. KOH/gm | | | 178 | 177 |
| Moisture-insoluble-unsaponifiable percent | 4.3 | 3.9 | 10.4 | 11.8 |
| Iodine value (Hanus) | 4.2 | 5.6 | | |
| Melting point °F | 58.8 | 75.6 | 59.0 | 78.0 |

As indicated in the above table the No. 1 pitch has a very low moisture-insoluble-unsaponifiable content and an extremely low iodine value. This pitch as indicated by its low iodine value is as saturated as double pressed stearic acid. The total fatty acid content of these pitches is very high in comparison with the fatty acid content of the so-called stearine pitches from animal and vegetable fats, the latter containing only about 10% of free and combined fatty acids.

The composition of the total fatty acids contained in the No. 1 and No. 2 pitches and the composition of the distilled hydrogenated fish oil fatty acids is given in Table II:

TABLE II

*Percent composition of fatty acids*

|  | No. 1 pitch | | No. 2 pitch | Distilled hydrogenated fish oil fatty acids |
|---|---|---|---|---|
| $C_{14}$ | 4.9 | 3.5 | 2.5 | 6.7 |
| $C_{16}$ | 21.7 | 20.0 | 9.2 | 28.8 |
| $C_{18}$ | 17.8 | 20.8 | 14.2 | 25.1 |
| $C_{20}$ | 22.7 | 21.1 | 17.6 | 21.1 |
| $C_{22}$ | 24.1 | 27.1 | 37.7 | 15.4 |
| $C_{24}$ and unidentified | 8.8 | 7.5 | 18.8 | 2.9 |

The data of Table II are graphically represented in the figure accompanying the specification. As noted from the above data, the No. 1 pitch and the No. 2 pitch are rich in $C_{20}$ to $C_{22}$ fatty acids.

Broadly, our invention is directed to coating compositions such as slushing compounds. A coating composition, according to the present invention, which will give good results consists of 40% to 90% petroleum oil, 55% to 5% petrolatum and 1% to 10% hydrogenated fish oil fatty acid No. 2 pitch.

The petroleum oil may have a viscosity of from 35 seconds to 250 seconds at 210° F. Saybolt Universal and the petrolatum may have a melting point of from 135° to 150° F. A particular slushing compound which has given superior results consists of:

Per cent by weight
Petroleum oil (49–51 secs. at 210° F. Saybolt Universal) _____ 75
Petrolatum (melting point 140°–142° F.) _____ 20
Hydrogenated fish oil fatty acid No. 2 pitch__ 5

It is, of course, to be understood that the addition of hydrogenated fish oil fatty acid No. 2 pitch to any type of lubricant or coating composition, where slippage is a disadvantage is contemplated by the present invention.

Other types of slushing compounds to which hydrogenated fish oil fatty acid pitch may be added in amounts from 1% to 10% are those which comprise an oil and wax or alkyl stearates or naphthenates, or oil soluble sulfonic acid soaps, as described in United States Patents Nos. 2,186,018, 1,630,101 and 2,119,522. Also the pitch may be added to a compound comprising oil soluble sulfonic compounds and waxes (U. S. Patent 1,795,993) or petrolatum and zinc chromate (U. S. Patent 1,706,333).

It has been found that the use of the No. 2 pitch, according to the present invention, gives greatly superior antislippage properties to slushing compounds as compared with the use of cotton-seed or animal pitch.

Having now described our invention and the manner in which the same is to be carried out, what we claim is:

1. A slushing compound having superior anti-slipping properties comprising a petroleum fraction selected from the group consisting of petroleum oil, petrolatum and wax, and hydrogenated fish oil fatty acid pitch.

2. A slushing compound having superior anti-slipping properties comprising a petroleum fraction selected from the group consisting of petroleum oil, petrolatum and wax, and a hydrogenated fish oil fatty acid pitch composed substantially of a saturated material relatively poor in unsaponifiable matter and containing at least about 50 per cent of $C_{20}$ to $C_{24}$ and higher molecular weight fatty acids.

3. A slushing compound having superior anti-slipping properties containing from about 40 per cent to about 90 per cent of a petroleum fraction selected from the group consisting of petroleum oil, petrolatum and wax, and from about 1 per cent to about 10 per cent hydrogenated fish oil fatty acid pitch.

4. A slushing compound consisting of from about 40% to about 90% petroleum oil, from about 5% to about 55% petrolatum, and from about 1% to about 10% hydrogenated fish oil fatty acid No. 2 pitch.

5. A slushing compound consisting approximately of 75% petroleum oil, 20% petrolatum and 5% hydrogenated fish oil fatty acid pitch.

6. A slushing compound as claimed in claim 4 wherein the petroleum oil has a viscosity of from 35 seconds to 250 seconds at 210° F. Saybolt Universal and the petrolatum has a melting point of from 135° F. to 150° F.

7. A slushing compound as claimed in claim 5 wherein the hydrogenated fish oil fatty acid pitch is a saturated material relatively poor in unsponifiable matter and containing at least about 50% of $C_{20}$ to $C_{24}$ and higher molecular weight fatty acids.

FREDERICK H. MacLAREN.
ELMER WADE ADAMS.